United States Patent [19]
Kubo et al.

[11] Patent Number: 5,013,494
[45] Date of Patent: May 7, 1991

[54] PROCESS FOR PREPARING BLAZED HOLOGRAMS

[75] Inventors: Katsuhiro Kubo, Yamatokoriyama; Keiji Sakai, Nara; Yukio Kurata, Tenri; Hideyoshi Yamaoka, Matsubara, all of Japan

[73] Assignee: Sharp Kabushiki Kaisha, Japan

[21] Appl. No.: 388,118

[22] Filed: Aug. 1, 1989

[30] Foreign Application Priority Data

Aug. 3, 1988 [JP] Japan ................ 63-194161

[51] Int. Cl.$^5$ ............... B29D 11/00; B29C 45/00
[52] U.S. Cl. ..................... 264/1.3; 264/1.4; 264/2.5; 264/219; 264/328.1
[58] Field of Search ............ 264/1.3, 1.4, 2.5, 219, 264/328.1

[56] References Cited

U.S. PATENT DOCUMENTS

| 818,966 | 4/1906 | Ives | 264/1.3 |
| 3,680,945 | 8/1972 | Sheridan | 264/1.3 |
| 4,440,699 | 4/1984 | Smid et al. | 264/1.4 |
| 4,619,804 | 10/1986 | Leonard et al. | 264/1.3 |

FOREIGN PATENT DOCUMENTS

| 132271 | 8/1983 | Japan | 264/1.3 |
| 80028 | 4/1987 | Japan | 264/1.3 |
| 101438 | 5/1987 | Japan | 264/1.3 |
| 146624 | 6/1987 | Japan | 264/1.3 |
| 233234 | 10/1987 | Japan | 264/1.3 |

Primary Examiner—James Lowe
Attorney, Agent, or Firm—Bryan, Cave, McPhetters & McRoberts

[57] ABSTRACT

A process for preparing blazed holograms suitable for mass-production which includes fabricating a glass or metal plate having a surface of serrated cross section, disposing the glass or metal plate in an injection mold to allow the surface of serrated cross section to constitute an inner surface of the mold. Then injecting an acrylic resin in molten form into the mold under a specific molding pressure, and removing a molded acrylic resin from the glass plate or metal plate to obtain an acrylic blazed hologram.

11 Claims, 4 Drawing Sheets

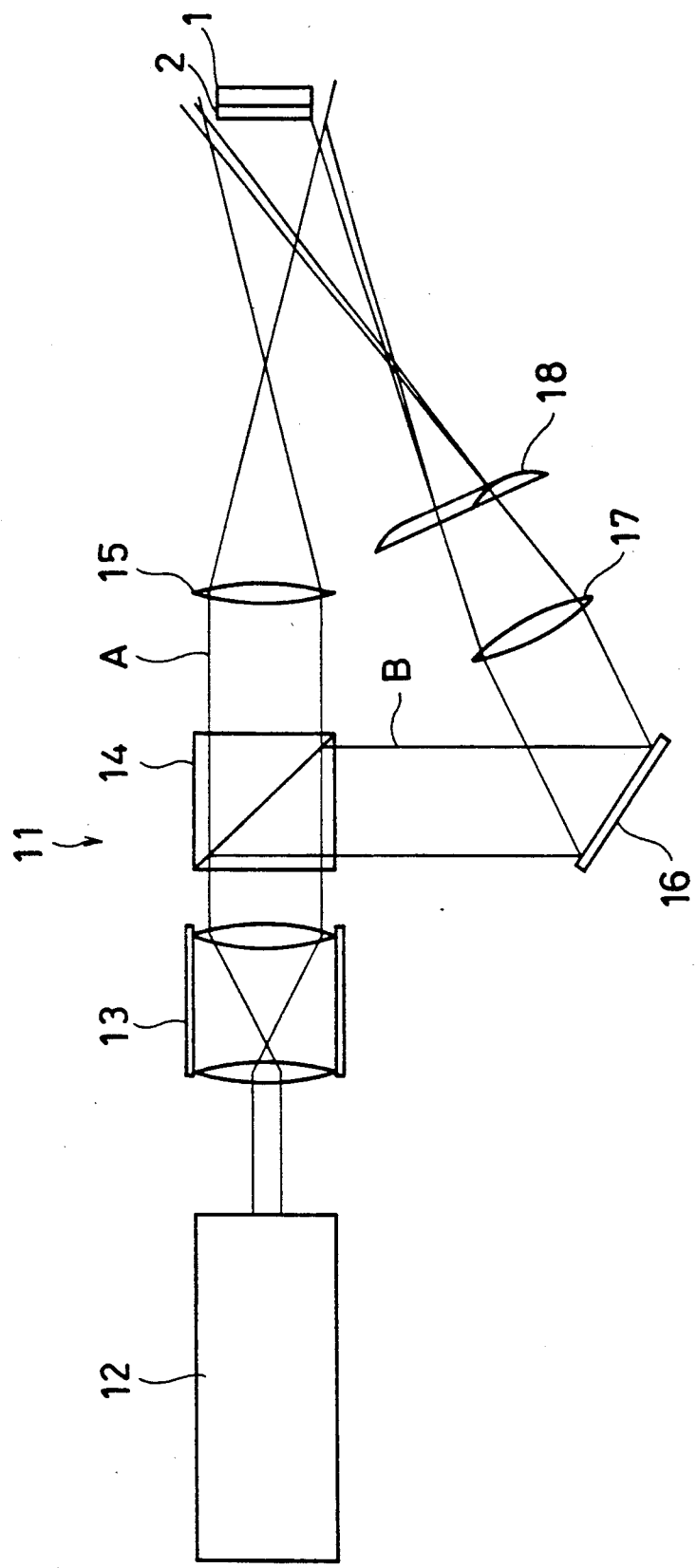

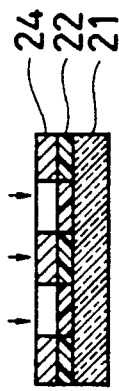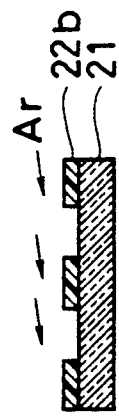
FIG. 6a PRIOR ART   FIG. 6b   FIG. 6c   FIG. 6d   FIG. 6e   FIG. 6f

FIG. 5a PRIOR ART   FIG. 5b   FIG. 5c   FIG. 5d   FIG. 5e

PROCESS FOR PREPARING BLAZED HOLOGRAMS

BACKGROUND OF THE INVENTION

1. Field of the Invention

The invention relates to a process for preparing a blazed holographic optical component for a pickup that reproduces optically recorded information, and particularly to a process for effectively preparing blazed holograms having a serrated cross section.

2. Description of the Prior Art

Heretofore, a transmission diffraction grating providing on the surface grooves of a serrated cross-section is known as a blazed hologram, for components for hologram pickup (U.S. Pat. No. 3,680,945; "High-efficiency blazed grating couplers" Applied Physics Letters, Vol. 29, No. 5, 1, Sept. 1976; "Control of shape of groove for holographic grating" Applied Physics, Vol. 45, No. 7 (1976)).

The grooves of serrated cross section in blazed holograms are formed to improve photo utilization efficiency, which is reported by the report of "Efficiency Holographic Optical Head for CD Players" at Lecture Meeting of 48th Applied Physics Meeting.

The blazed hologram as above-mentioned is prepared conventionally in the following manner, a photo resist resin is first coated on a glass plate or a transparent plastic plate, and is then etched to have a serrated cross section. Further conventional method is that a rubber material is layered over the obtained blazed hologram for its replication (U.S. Pat. No. 3,680,945).

However, the blazed holograms obtained by such methods using resist resin or rubber material were not sufficient in shape-stability and durability of diffractive function.

Recently, another method has been performed whereby a glass plate or transparent plastic plate is directly etched to be serrated on the surface for providing blazed holograms. The method will be further detailed hereunder.

A glass substrate 21 is first washed (FIG. 5(a)) and coated with a photosensitive material such as a photo resist 22 (FIG. 5(b)), which is then exposed by the two-beam interference method or an electron beam drawing method and developed to form a blazed resist pattern 22 (FIGS. 5(c) and (d)). Then, the resulting glass substrate 21 is etched to afford a blazed hologram 23 (FIG. 5(e)).

Alternatively, a glass substrate is washed (FIG. 6(a)) and applied with a photosensitive material for photo resist 22 (FIG. 6(b)), which is exposed to light through a photo mask 24 (FIG. 6(c)). Then, the photo resist 22 is developed to form a rectangular cross section (FIG. 6(d)) and the resulting glass substrate is etched by slantwise irradiation of an ion beam such as Ar gas (FIG. 6(e)) to afford a blazed hologram 23 having serrated cross section (FIG. 6(f)).

In case that transparent plastic plate is used, the hologram is similarly prepared by the abovesaid manner.

However, the conventional methods require many steps for obtaining blazed hologram 23, and thereby take a longer time in working as a whole, so that there is a problem that the price per finished blazed hologram is comparatively expensive.

SUMMARY OF THE INVENTION

According to the present invention, a process for preparing blazed holograms is provided which comprises fabricating a glass or metal plate having a surface of serrated cross section corresponding to the desired blazed grating pattern, disposing the glass or metal plate in an injection mold to allow the surface of serrated cross section to constitute an inner surface of the mold, injecting a molten acrylic resin into the mold under a molding pressure of 1500 kgf/cm$^2$ or more and removing the molded acrylic resin from the glass or metal plate to obtain an acrylic blazed hologram.

The present invention has characteristics of utilizing as a molding stamper a glass or metal plate having a blazed pattern and employing the plate for a specific injection molding to prepare an acrylic resin blazed hologram.

According to the process of the present invention, by using the single glass or metal plate with a simple injection molding process, a blazed hologram of acrylic resin can be effectively mass-produced having an excellent reproducibility, so that steps for forming blazed holograms can be simplified and manufacturing cost is reduced.

Also, in the event that a metal plate having a blazed grating pattern is employed, since it has higher mechanical durability than the glass plate, it can be used as a molding stamper for a longer time, and a further reduction of manufacturing cost can be realized.

BRIEF DESCRIPTION OF THE DRAWINGS

FIGS. 1 to 3 illustrate the process of the present invention.

FIG. 3 is a schematic construction view showing an optical system used in the two-beam interference method.

FIG. 4 is an illustrative view showing another example of the present invention.

FIGS. 5 and 6 show conventional examples. FIGS. 5(a) through 5(e) are sectional views showing steps for preparing a blazed hologram, and FIGS. 6(a) to 6(f) are sectional views showing conventional steps for preparing a blazed hologram.

DESCRIPTION OF THE PREFERRED EMBODIMENTS

Figure 1A:
FIG. 1(a) is a sectional view showing a serrated glass plate.

The present invention has been accomplished on the basis of the findings that when the aforesaid glass or metal plate is used as a stamper and an acrylic resin is subjected to injection molding under a specific molding pressure, the surface pattern of the glass or metal plate can be transferred to the molded acrylic resin with an excellent reproducibility.

In the process of the present invention, first, a glass or metal plate having a surface of serrated cross section corresponding to a desired blazed grating pattern to be formed is fabricated as a molding stamper.

Herein, the abovesaid glass plate is fabricated in the same manner as for producing a conventional glass blazed hologram. In detail, a photo resist is coated on a glass substrate, subjected to exposure and development thereby forming a predetermined photo resists pattern. Then, an etching treatment is effected on the surface of the glass substrate by using said pattern as a photo mask, thereby providing the aforesaid glass plate. One example thereof will be shown in the Example described later.

The glass substrate to be used here is suitably quartz glass plate which has been employed in the conventional blazed hologram. Other glass plates (at about 1-3 mm in thickness) of such as soda glass plate, borosilicate glass plate and the like are also usable. A blazed grating pattern formed on the plate surface is determined by the intended diffraction efficiency and order of diffraction. A suitable pattern is usually 1.5-2.5 μm in pitch and 0.6-0.8 μm in depth.

The metal plate having a serrated surface portion can be fabricated by the following steps:

A photo resist is coated on a glass substrate or synthetic resin substrate, exposed and developed to produce a predetermined photo resist pattern. The surface of the substrate is used as a photo mask and etched to provide a glass or synthetic resin substrate with a serrated surface.

Then, a metal thin film is deposited on the serrated surface of the glass or synthetic resin substrate, and electrocast by using a suitable metal for electrocasting to the surface portion to form a thick metal layer, followed by separation from the glass or synthetic resin substrate, so that a final metal plate having a serrated surface can be obtained.

Preferable metals used for the formation of the metal thin film and for electrocasting are Ni, Ni-Co alloy and the like. Also, the synthetic resin substrate may be polymethylmethacrylate, polycarbonate and the like. Furthermore, the metal thin film may be formed by sputtering or vacuum deposition in a thickness of 500-2000 Å. The thickness of the metal layer by electrocasting may suitably be 0.2-0.4 mm.

In the present invention, the glass or metal plate having the serrated surface portion is employed for the injection molding of an acrylic resin. The preferable mold used in the injection molding is a separable type for formation of a planar plate and has a cavity to provide a sufficient space corresponding to the planar plate even if the glass or metal plate is disposed in the cavity. The size of the cavity is practically decided by the sizes of desired blazed hologram or those of the glass or metal plate. The acrylic resin to be molded may suitably be poly-lower ($C_{1-4}$) alkyl(meta-)acrylate for molding at MW of $10^4$-$10^6$ order, such as polymethacrylate, polymethylmethacrylate and polybutylmetacrylate. Among them polybutylmethacrylate is most suitable in respect of transmittancy.

A suitable molding temperature is higher than the melting temperature of the above-mentioned acrylic resin, usually about 200° C. - 270° C., preferably 240-260° C.

The injection molding is effected under high molding pressure of 1500 kgf/cm$^2$ or more. Molding pressure lower than 1500 kgf/cm$^2$ can not provide sufficient transferring efficiency of the blazed grating pattern and is not suitable for mass production. Under molding pressure of 1500 kgf/cm$^2$ or more, blazed hologram with full transferring efficiency of the blazed grating pattern can be obtained with excellent reproducibility. In consideration of the pressure limit by the pressurizing apparatus, the pressure is to be set in a range of 1500-3100 kgf/cm$^2$.

It is usually preferable that molding time be 1-20 seconds and pressure holding time be 5-30 seconds, and cooling time is sufficient at about 20-60 seconds.

The molded acrylic resin by the above-mentioned molding process is removed from the glass or metal plate to provide a desired blazed hologram replica usually having a thickness of 1 to 3 mm. The removal can be smoothly conducted without giving a stress or shock due to the difference in materials between the acrylic resin and the glass or metal plate. Thus, a release agent is not required for molding.

By repeating the above molding process with one fabricated glass or metal plate, the desired acrylic blazed hologram replica can be mass-produced with substantially only one process step (the injection molding process).

The resulting blazed holograms after molding may be subjected to annealing for removal of internal stress.

EXAMPLES

Example 1

One example of the present invention will be detailed in accordance with FIGS. 1-3.

Figure 1B:
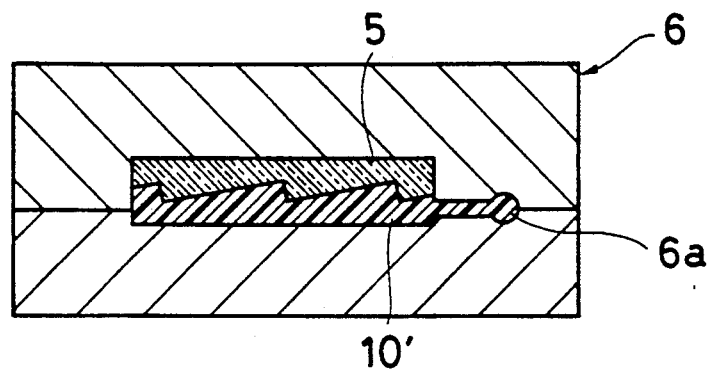
FIG. 1(b) is a sectional view showing the glass plate set in a mold.
Figure 1C:
FIG. 1(c) is a sectional view of the acrylic blazed hologram.

A blazed hologram prepared by the process of the present invention has a serrated cross section as shown in FIG. 1(c) and is made of polymethylmethacrylate.

Figure 2A:
FIGS. 2(a) to 2(e) are sectional views showing the steps for fabricating the glass plate used for the present invention.
Figure 2B:
Figure 2C:
Figure 2D:

To prepare the above-mentioned blazed hologram 10, first prepared is, as shown in FIG. 1(a), a glass plate 5 which serves as a stamper for molding blazed holograms. The fabrication of the glass plate 5 may be conducted in the same manner as the conventional glass blazed holograms. In detail, as shown in FIG. 2(a), a glass substrate 1 is washed by an organic solvent. Then, as shown in FIG. 2(b), a photo resist 2 (photosensitive material) is coated on the glass substrate 1. The photo resist is exposed by the two-beam interference method as shown in FIG. 2(c) or an electron beam method, and developed to form a blazed resist pattern as shown in FIG. 2(d).

An optical system 12 shown in FIG. 3 is used for the above-mentioned two-beam interference method. Laser beam irradiated from a source 11 is transformed by a beam expander 13 to produce larger diameter parallel beams, then split in two beams by a beam splitter 14. Photo flux A of one of the parallel beams as split is collected first by a collection lens 15 and then irradiated onto the photo resist 2. The other photo flux B is reflected by a mirror 16 to pass a collection lens 17 and cylindrical lens 18 to have astigmatism and be collected, then, be irradiated onto the photo resist 2, so that the blazed resist pattern can be formed.

In the Example, a quartz glass plate of 3 mm thickness and 4 mm diameter is used as the glass substrate 1, and S-1400 made by SHIPLEY Inc. is used for the photo resist, and blazed resist pattern is of 2 μm pitch.

Figure 2E:

The glass substrate 1 provided with the blazed resist pattern is etched by ion beam etching as shown in FIG. 2(e), so that there is provided a glass plate 5 having a surface portion of serrated cross section of 2 μm pitch and 0.7 μm depth.

Then, as shown in FIG. 1(b), the glass plate 5 is set in the mold 6 for injection molding to be used as molding stamper, and then polymethylmethacrylate (MW 15000-20000) 10' is injected through a gate 6a in the mold 6, thereby performing the injection molding.

Conditions for the injection molding in the Example are as follows.

Mold for injection molding : Cavity capacity 2 mm × 4 mm φ (Stainless)
Mold temperature : 90° C.
Resin temperature : 240-260° C.
Injection time : about 2 seconds (10 mm/sec)
Mold pressure : 1550 kgf/cm²
Pressure holding time : about 15 seconds
Cooling time : about 30 seconds The process of this injection molding and the removal of the molded resin achieved a blazed hologram 10 (2 × 4 mm φ; pattern pitch 2 μm, depth 0.7 μm) of polymethylmethacrylate which hologram includes a completely transferred pattern from the surface of the glass plate 5. The obtained blazed hologram was annealed at 75° C. for one hour, and then applied to a hologram head. Photo utilization efficiency in this case was 12% which is equal to or more than that of conventional glass blazed holograms.

According to the aforesaid process, once the glass plate 5 has been fabricated, the blazed hologram can be prepared by only one process step, i.e., injection molding, to enable repeated production of the blazed hologram with excellent reproducibility. As a result, preparation of blazed holograms is simplified, thereby lowering manufacturing cost.

The above-mentioned Example shows the glass plate 5 fabricated by the two-beam interference method. The invention is not limited thereto and may alternatively be so adapted that a photo mask having a certain pattern is used as the conventional example to make exposure of photo resist, and then, develop the same. Then, Ar gas and the like is used to perform slantwise ion beam etching thereby providing the glass plate 5.

EXAMPLE 2

Another example of the invention will be detailed according to FIG. 4. For convenience of explanation, the members having the same function as those of the above-mentioned Example 1 are given the same reference numerals and are not given explanations therefor.

Figure 4A:
FIG. 4(a) is a sectional view showing the deposition of Ni thin film on the serrated glass plate.
Figure 4B:
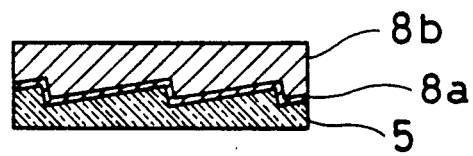
FIG. 4(b) is a sectional view showing the electrocast materials thereon.

The preparation process of blazed holograms of this Example is as shown in FIG. 4(a)-(e). Firstly, over the serrated surface of the glass plate 5 used in Example 1 is formed a Ni thin film 8a as shown in FIG. 4(a) by sputtering. The resultant is subjected as shown in FIG. 4(b) to electrocasting by Ni, the same material as the said film.

Thickness of the Ni thin film 8a is about 1000 Å, and thickness of the metal layer by electrocasting is about 0.3 mm. Current density for the electrocasting is 12 A/dm².

Figure 4C:
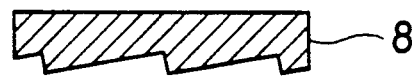
FIG. 4(c) is a sectional view of an electrocast metal plate.
Figure 4D:
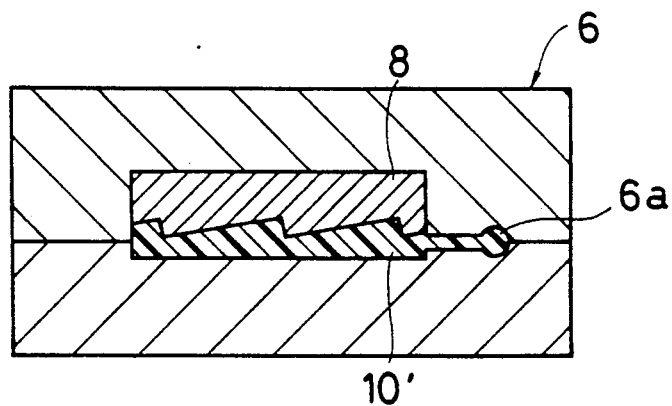
FIG. 4(d) is a sectional view showing the metal plate set in a mold.
Figure 4E:
FIG. 4(e) is a sectional view of the acrylic blazed hologram.

As shown in FIG. 4(c), the electrocast layer 8b is released together with the thin film 8a to obtain a metal plate 8. Thereafter, the metal plate 8 is set, as shown in FIG. 4(c), in the mold 6, and polymethylmethacrylate 10' is injected through a gate 6a to perform the injection molding under the same conditions as in Example 1. As shown in FIG. 4(e), a blazed hologram 10 made of polymethylmethacrylate 10' was obtained.

The blazed hologram as obtained above has an excellent photo utilization efficiency equal to that of Example 1.

In accordance with this process, the preparation of blazed holograms can be simplified and manufacturing cost can be lowered, as seen in the Example 1. Further, the durability of the metal plate 8 is superior to that of the glass plate 5, so that further lowering of the cost can be realized.

To be noted especially is that according to the present invention, one metal plate enables production of at least 10,000 blazed holograms.

What we claimed is:

1. A process for preparing blazed holograms which comprises fabricating a glass or metal plate having a surface of serrated cross section corresponding to a desired blazed grating pattern, disposing the glass or metal plate in an injection mold to allow the surface of serrated cross section to constitute an inner surface of the mold, injecting an acrylic resin in molten form into the mold under molding pressure of 1500 kgf/cm² or more and removing a molded acrylic resin from the glass or metal plate to obtain an acrylic blazed hologram.

2. The process of claim 1 in which the acrylic resin is a poly-lower ($C_{1-5}$) alkyl acrylate or methacrylate.

3. The process of claim 1 in which the acrylic resin is polymethylmethacrylate.

4. The process of claim 1 in which the molding pressure is 1500 to 3100 kgf/cm².

5. The process of claim 1 in which the acrylic resin is injected at a temperature in the range from about 200 to 270° C.

6. The process of claim 1 in which the acrylic blazed hologram has a surface of serrated cross section of 1.5-2.5 μm in pitch and 0.6-0.8 μm in depth.

7. The process of claim 1 in which the acrylic blazed hologram has a thickness of 1 to 3 mm.

8. The process of claim 1 in which the molding is repeated for mass-production using the single glass plate or metal plate.

9. The process of claim 1 in which the glass plate having a surface of serrated cross section is one fabricated by an etching treatment of a glass substrate the surface of which is coated with a photo resist pattern.

10. The process of claim 1 in which the metal plate having a surface of serrated cross section is one fabricated by electrocasting of a metal over a glass or synthetic resin substrate having a surface of serrated cross section.

11. A method according to claim 1 wherein the replica is annealed to remove internal stress after molding.

* * * * *

UNITED STATES PATENT AND TRADEMARK OFFICE
CERTIFICATE OF CORRECTION

PATENT NO. : 5,013,494
DATED : May 7, 1991
INVENTOR(S) : Katsuhiro Kubo et al.

It is certified that error appears in the above-identified patent and that said Letters Patent is hereby corrected as shown below:

```
Column 1, line 27:  Change "," to --;--.
Column 3, line 55:  Change "polybutylmetacrylate" to
--polybutylmethacrylate--.
Column 3, line 56:  Change "polybutylmethacrylate" to
--polymethylmethacrylate--.
Column 3, line 67:  Change "hologram" to --holograms--.
Column 4, line 45:  Change "12" to --11--.
Column 4, line 47:  Change "11" to --12--.
Column 4, line 60:  Insert --the-- before "blazed".
Column 5, line 49:  Insert --plate-- after "resultant".
```

Signed and Sealed this

Ninth Day of February, 1993

Attest:

STEPHEN G. KUNIN

Attesting Officer

Acting Commissioner of Patents and Trademarks